United States Patent [19]

Champetier

[11] Patent Number: 4,846,425

[45] Date of Patent: Jul. 11, 1989

[54] METHOD AND APPARATUS FOR ATOMIC BEAM IRRADIATION

[75] Inventor: Robert J. Champetier, Torrance, Calif.

[73] Assignee: Hughes Aircraft Company, Los Angeles, Calif.

[21] Appl. No.: 173,007

[22] Filed: Mar. 28, 1988

Related U.S. Application Data

[63] Continuation of Ser. No. 792,380, Oct. 29, 1985, abandoned.

[51] Int. Cl.$^4$ .............................................. B64G 1/66
[52] U.S. Cl. .................................. 244/158 R; 134/1; 134/2
[58] Field of Search .................... 244/158 R; 134/1, 2

[56] References Cited

U.S. PATENT DOCUMENTS

| | | | |
|---|---|---|---|
| 3,868,271 | 2/1975 | Poley et al. | 134/1 |
| 4,452,642 | 6/1984 | Dietz et al. | 134/2 |
| 4,500,564 | 2/1985 | Enomolo | 134/1 |
| 4,600,442 | 7/1986 | Pastor et al. | 134/2 |

OTHER PUBLICATIONS

Gillette et al., "Proton-Induced Contaminant Film Effects on Ultraviolet Reflecting Mirrors", Applied Optics, Mar. 1971.
Beverly, W. D. et al., Removal of Hydrocarbon Contaminant Film From Spacecraft..., AIAA 7th Thermophysics Conf., 1972, pp. 159–175.
Predmore, R. E., et al., Exospheric Cleaning of the Earth Radiation Budget Solar Radiometer..., SPIE vol. 338, pp. 104–113.
Phillips, A. et al., Maintenance of Contamination Sensitive Surfaces on Board Long-term Space Vehicles, Jour. of Environmental Sciences, Jul. 1984, pp. 19–21.

Primary Examiner—Galen Barefoot
Attorney, Agent, or Firm—W. J. Streeter; A. W. Karambelas

[57] ABSTRACT

Method and apparatus are disclosed for automatically and remotely removing unwanted organic films from surfaces of vehicles and satellites in space. A particle beam generator (12) draws molecular oxygen from an on-board supply chamber (14) and develops a stream of positively charged oxygen ions (40). These ions are directed towards a surface or component of a spacecraft such as a solar cell, radiation emission aperture, or sensor objective lens (44) which has been coated by an opacifying, organic contaminant layer (42) that impairs the efficacy of the spacecraft. The ions (40) bombard the contaminant layer (42) and remove it by both kinetic interaction and chemical oxidation. Spacecraft surfaces and components may be restored and renewed to their original operational capabilities through this method of volatilizing debilitating occluding residues which have been hardened by solar radiation away from the spacecraft as harmless gases (50).

8 Claims, 1 Drawing Sheet

METHOD AND APPARATUS FOR ATOMIC BEAM IRRADIATION

This application is a continuation of application Ser. No. 792,380, filed Oct. 29, 1985, now abandoned.

BACKGROUND OF THE INVENTION

1. Field of the Invention

The present invention relates to a system for automatically removing unwanted films from the surfaces of spacecraft. More specifically, this invention is concerned with methods and means for removing layers of organic matter which are tightly bound by the polymerizing action of the sun's ultraviolet radiation to critically important surfaces of vehicles in space.

2. Background Information

Once a spacecraft is exposed to the hostile environment beyond the upper strata of the earth's atmosphere, microscopic substances present in space as well as particles liberated from the spacecraft itself form occluding layers over sensitive surfaces which serve as interfaces for the passage of radiation in and out of the craft. These unwanted substances are attracted to surfaces by electrostatic forces or are deposited on the exterior of a vehicle after a random collision as the craft moves along its course in space. After these particulates adhering to the spacecraft are irradiated by the sun's ultraviolet rays, they bond together and to the radiation interface surfaces on the exterior of the satellite. The sun's energy helps form long chains of organic molecules called polymers which are difficult to remove from these important sensor and communication regions of the vehicle.

Once a sensor or radiation aperture is covered with a partially opaque coating, the efficiency and efficacy of the entire space system is placed in great jeopardy. The transmission of vital radio, infrared, optical, or laser signals may be impaired or precluded. The capacity of an orbiting sensor platform which collects, stores, or analyzes radiation from the earth's surface or atmosphere in order to help scientists conduct research may be severely diminished. A satellite which depends upon celestial navigation techniques to remain on course and at the proper altitude can become completely useless if the objective lens of its star sensor is obscured by a shading scale of space debris.

Nearly every craft launched into space suffers from the inevitable reduction in operational effectiveness that results from the formation of these contaminant coatings. An increasing number of scientific, military, and commercial endeavors have begun to reap the benefits of the exploitation of the regions above our atmosphere. Space-based telescopes have extended the earthbound limits of astronomical observation. Remote sensing from orbit is the basis of modern methods of military surveillance and weather forecasting. Orbital detection systems play a critical role in studies concerning earthquake detection, agricultural yields, changes in the world's oceans, and exploration for petroleum and other scarce mineral resources. The utility of virtually all of these expensive systems is slowly but inescapably attenuated by the gradual build up of these unwelcome veneers.

There currently exists no prior methods or devices known to the inventor which may be employed to automatically clean radiation aperture surfaces by removing these deleterious organic films from a spacecraft in orbit. If the particulates clinging to exterior sensors and radiators have never been exposed to ultraviolet radiation, they are not converted into stubborn, strongly adhesive polymers and may be dispersed by simple sublimation if the coated substrate surface can be sufficiently heated. Since all external areas of a space vehicle in orbit are eventually illuminated by the sun, the sublimation of contaminants by heating is a solution which offers few practical advantages.

For space vehicles in low orbits, some cleaning can occur if critical surfaces are positioned so that they face the direction of motion of the craft. In this way, traces of atmospheric oxygen which are present sixty to one hundred miles up may impinge upon the organic films and eradicate them via oxidation reactions. This technique is only marginally effective and is limited to vehicles like the space shuttle which are constrained to operate within a very narrow range of low altitudes. The vast majority of craft which require sensor and power surface cleaning circumnavigate the world in far higher orbits, including geosynchronous satellites which circle the globe over twenty three thousand miles above the earth's surface.

In terrestrial environments, similar organic materials may be dispersed using special lamps under laboratory conditions. Atmospheric oxygen can be converted to its allotropic counterpart, ozone, and atomic oxygen by stimulation with an ultraviolet lamp. The combined effect of the interaction of these gases with the polymerized layers and the ultraviolet energy is the elimination of a few of the uppermost strata of contaminants. The great bulk of the organic coating is not susceptible to this method of ultraviolet-ozone treatment, since many layers are simply re-polymerized by the additional radiation.

High energy beams can be used to bombard surfaces and disband occluding films through kinetic interactions, but they concomitantly damage and destroy the sensitive surfaces which they are intended to restore. These techniques solve the problem by brute force, and are not selective enough to use on spaceborne surfaces which are often enclosed by delicate, protective optical coatings.

None of the methods or devices described above provides an effective solution to the problem of the degradation of spacecraft by organic film obscuration of their vital radiation apertures. An effective solution to this problem would satisfy a long felt need experienced by the aerospace community for over twenty-five years. A truly practical and reliable means for removing undesirable films would represent a major advancement in space technology that would enhance the utility of nearly all future space systems and magnify the opportunities for scientific, military, and commercial enterprise in space. Such a device would ideally be suited to operate in cooperation with a wide variety of space systems and to perform cleaning tasks reliably for a myriad of critical satellite components without harming the underlying hardware.

SUMMARY OF THE INVENTION

The present invention provides an efficacious, practical, cost-effective, and straightforward solution to the problem of organic film obscuration of vital spaceborne radiation interface surfaces. This invention utilizes an on-board supply of a cleaning reagent capable of being formed into a stream depolymerizing particles. These particles are aimed at a target surface bearing an unwanted coating which has been tightly bonded to the spacecraft by the action of the sun's ultraviolet rays. This molecular, atomic, ionic, or excited plasma beam is generated within a specific range of beam energy so that the target surface is not damaged by excessive kinetic interactions. The cleaning reagent particles interact chemically with the organic film on the target, which is held at a neutral electrical potential, in an oxidation reaction. The reactants are then transported away from the spacecraft as liberated, volatile gases. The cleaning reagent may alternatively be deployed from a chamber in the spacecraft as a molecular gas in the vicinity of the target during a period of intense solar activity. Positive ions formed after the release of the molecular gas are then accelerated back to the spacecraft, which has accumulated a net negative charge as a consequence of the solar disturbance, which occurs, on average, about fifteen percent of any given interval in orbit. The returning stream of ions accomplishes the same oxidation reaction with the same result.

It is, therefore, an object of the present invention to provide an effective means of solving the problem of the degradation of radiation collection and exchange surfaces as well as other components of spacecraft which might suffer from the formation of opacifying strata.

It is a further object of this invention to automatically restore and renew lenses, sensors, laser and radar apertures, windows, reflectors, solar cells, thermal control surfaces, radiation measurement devices, mirrors, telescopes, thermal imaging, scanning and staring arrays, detectors, indicator lamps, and illuminating equipment to their original, unblemished condition. Other internal and external components in orbit such as transponders, antennas, actuators, valves, nozzles, rocket parts, docking assemblies, robotic arms, housings, and cryogenic devices may also be refitted with equal success. Power generating cells impaired by nontransmissive, contaminant coatings can be rejuvenated by applying the method and apparatus of the present invention. This means that the life of enormously expensive communications, military, and scientific satellites can be greatly extended by insuring that their means of generating electricity is not compromised by the devitrification of their light gathering surfaces.

Yet another object of the invention is to supply a solution to the problem of satellite maintenance which is compatible with a wide variety of designs and space system missions. The present invention may be constructed as a rugged, compact, and reliable subsystem that could easily be integrated into nearly any spacecraft design.

Another object of the invention is to achieve the desirable result of spacecraft cleaning without the added weight or complexity of a particle beam apparatus by exploiting the action of solar storms.

Still another object of the present invention is to clean space vehicles and other orbiting apparatus without impairing sensitive surfaces and destroying special coatings which protect space optics and external surfaces.

Another object of the invention is to provide spacecraft designers with the freedom to plan and build satellites that can be periodically restored using the methods and apparatus described in detail below. The ability to return orbiting components such as second surface, quartz/silver mirrors which are used for thermal control to their beginning-of-life performance capability would have a substantial beneficial impact on spacecraft design, since it would reduce weight requirements and minimize system constraints.

An appreciation of other aims and objects of the present invention and a more complete and comprehensive understanding of the this invention may be achieved by studying the following description of a preferred embodiment and by referring to the accompanying drawings.

DESCRIPTION OF A PREFERRED EMBODIMENT

Figure 1:
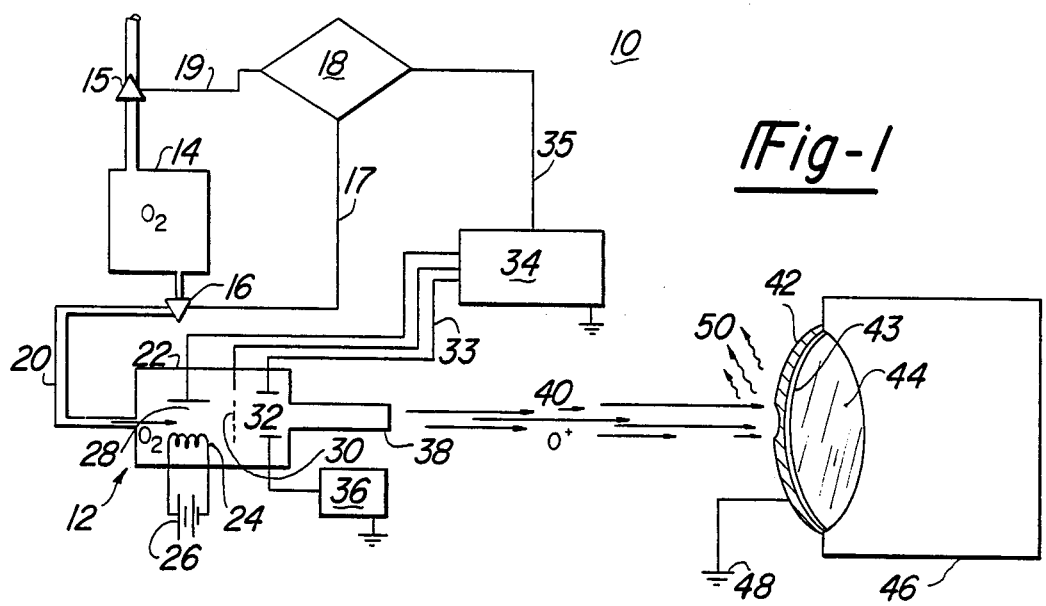
FIG. 1 is a schematic diagram of the present invention showing apparatus for generating a beam of oxygen ions or excited plasma which is directed at an optical surface bearing a contaminant layer that is volatilized by a chemical reaction.

Referring to FIG. 1, apparatus for atomic beam irradiation 10 is shown including a particle beam generator 12 which is supplied with molecular oxygen from supply 14 that is controlled by a valve 16. A control unit 18 coordinates the flow of oxygen to the beam generator 12 by sending an electrical signal over cable 17 to valve 16, which is opened and closed electrically. Oxygen gas flows from supply 14 into the evacuated acceleration chamber 22 of the particle beam generator 12 through conduit 20. A filament 24 heated by passing current through it from power supply 26 initiates a thermionic process that liberates electrons which accelerate toward a plate 28 held at a high electrical potential. The electrons that boil off the filament 24 and migrate toward plate 28 collide with the oxygen dimers and form oxygen ions. Various charged surfaces in the path of the oxygen ions such as control grid 30 are employed to attract and accelerate the positively charged oxygen ions 40 across the generator chamber 22 and out beam nozzle 38.

The oxygen ions 40 are directed at a target comprising a contaminant organic coating, which will be referred to as an episubstrate layer 42, and a radiation aperature surface. This surface below the episubstrate 42 is depicted in FIG. 1 as a lens substrate 44 mounted on a portion of a spacecraft schematically illustrated as 46. Lens 44 is electrically grounded in order to obtain the full effect of the positively charged ions 40 which bombard the unwanted organic layer 42 without damaging the optical coating 43 which protects lens 44. When the ions 40 impinge upon layer 42, an oxidation reaction occurs and the organic materials in layer 42 break down, combine with the oxygen 40, and are dispersed as volatile gases 50 away from the spacecraft 46. The compounds formed by this chemical interaction usually comprise carbon monoxide, ammonia, methane, and water. The beam generator 12 can be mounted on a spacecraft so that it is permanently aimed at a critcal radiation aperture surface such as lens 44, or may be adapted to move by remote control on a hinge or gimbal in order to enhance its range and clean more than one fixed area of a spacecraft.

Figure 2:
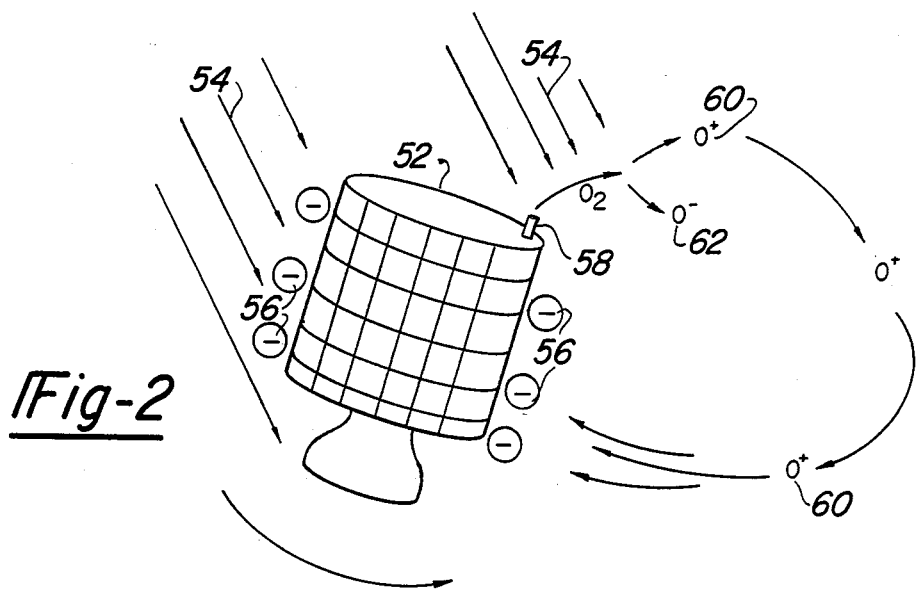
FIG. 2 is a perspective view of a satellite exposed to the energy of a solar storm which presents an opportunity to clean the spacecraft surfaces by deploying molecular oxygen and allowing positive oxygen ions formed by the solar disturbance to accelerate back toward the negatively charged spacecraft under the influence of electrostatic forces. This alternative method obviates the need for the beam generating apparatus shown in FIG. 1.

FIG. 2 reveals an alternative embodiment of the present invention which avoids the use of the beam generator 12 shown in FIG. 1. A satellite 52 includes a chamber of oxygen 14 connected by a valve 15 operated by electrical signals dispatched over cable 19 from control unit 18 (shown in FIG. 1). The chamber is connected to oxygen jet 58. During a period of intense solar activity, the satellite is bombarded with photons 54 which impose a negative charge on its hull (shown by negative signs 56). When molecular oxygen is released through valve 15 to jet 58, the same solar radiation ionizes a significant portion of the oxygen dimers released in ambient space and creates both positively and negatively charged oxygen ions 60 and 62 which move away from satellite 52. Due to the Debye Effect, a negative charge 56 is imposed on the craft's hull. The positive ions 60 are electrostatically attracted and accelerated back toward the spacecraft. As they collide with the satellite's exterior, they mimic the technique employed by the beam generator 12 described above and illustrated schematically in FIG. 1. This technique may be performed by commanding the control unit 18 to open valve 15 via radio signal from personnel on the earth when they have detected a solar storm. Alternatively, a sensor (not shown) coupled to control unit 18 may be installed permanently on the spacecraft 52 to monitor solar radiation 54 and perform the cleaning operation automatically when a threshold level of radiation is detected.

Although oxygen is the preferred cleaning agent, any member of the halogen family will perform the film removal task. Any beam of particles which will remove organic films by a chemical reaction which disperses the unwanted patina from surfaces in a low pressure environment is suitable as a cleaning agent for this invention. Although the inventor currently expects the best mode of the invention to require oxygen ions, any molecules, atoms, ions, sub-atomic particles, photons, or plasma that are capable of implementing the essential idea embodied by the present innovative methods and apparatus may be employed.

Similarly, although particles exhibiting a broad range of energies may be selected to practice the invention, each individual application may call for a specific energy range in order to avoid initiating a sputtering reaction that would damage the substrate beneath the unwanted contaminant layer. Recently performed laboratory tests suggest that the best spectrum of beam energy for this task is one to ten electron volts (eV) when oxygen is utilized. Some of the cleaning action of the invention is accomplished by the kinetic interaction of the beam and the film. If a particular film is known to be susceptible to dispersal by selective collisions with a particle stream having a precisely controlled energy level, that film may be abraided from a surface without the necessity of inducing a chemical interaction.

As described in detail above, the particles may be conveyed to the target using any instrumentality which will create the opportunity for the desired physical or chemical reaction. Although the preferred embodiment incorporates an ion gun that develops a cleaning agent flux by thermoionically cleaving molecular oxygen supplied from an on-board supply, any means for realizing the deployment of particles or energy fields that would bring the inventor's concept to fruition could be successfully exploited. Ion beams may be generated using well-known electron gun techniques or may be formed using less conventional microwave or radio frequency excitation circuitry which create plasma jets. A laser beam could be employed to selectively remove unwanted films by bombarding surfaces with photons bearing precise quantities of energy capable of liberating contaminants kinetically.

The invention need not be circumscribed by the constraints of a limited, exhaustible supply of oxygen or other cleaning agent. Gathering means mounted on a spacecraft may be adapted to work in concert with one of the embodiments explained above which could collect suitable particles from ambient space as a craft flies its course. These collected particles could be stored for automatic cleaning at regular intervals or could be expended on demand.

The beam generating means may be activated by radio commands from a ground control station on earth, by astronauts in a nearby space vehicle, or may be programmed using circuitry well known to those skilled in the electronics arts to clean sensitive surfaces periodically as regularly scheduled maintenance. The invention may also be adapted to operate in response to signals from a sensor which is mounted on or in the spacecraft to observe the build up of contaminant layers on crucial regions or components of the craft. A photoconductive sensor may be positioned to measure the degree of scattering or absorption of a laser beam from a tiny semiconductor laser installed adjacent to a solar cell or objective lens of a detector array. This information could comprise the input to a microprocessor which could, in turn, instruct the beam generator or other cleaning agent deployment means when to commence operation.

The methods and apparatus described in this application are not limited to cleaning surfaces on the exteriors of spacecraft. Although the inventor presently expects that the primary use of this invention will be to clean optics, sensors, and solar cells on the outside of the spacecraft which may be generically referred to as radiation exchange apertures, interior components of satellites can also suffer from the formation of unwanted residue layers. Cryogenic cooling systems within a spacecraft which enable radiation detectors to perform complex thermal imaging operations from orbit may also be cleaned and refurbished using these methods and apparatus. Any terrestrial environment which calls for the same contaminant film removal objectives can benefit from the application of the methods and apparatus of the present invention. Manufacturing processes which rely upon the fabrication or modification of substances or devices in substantially evacuated chambers may benefit from the opportunities presented by the important invention claimed in this patent application.

Although the present invention has been described in detail with reference to a particular preferred embodiment, persons possessing ordinary skill in the art to which this invention pertains will appreciate that various modifications and enhancements may be made without departing from the spirit and scope of the invention.

What is claimed is:

1. A method for irradiating a target in a low oxygen environment with a plurality of oxygen particles including the steps of:
    forming a plurality of oxygen particle ions having an energy between 1 and 10 electron volts and a first predetermined electrical potential from a particle supply;

charging the target having film portions thereon with a second predetermined electrical potential;

accelerating said oxygen particle ions toward the target;

bombarding the target with said oxygen particle ions in order to cause a chemical interaction between said oxygen particle ions and the film portions of the target; and subsequently removing the film portions of the target as a result of said chemical interaction with said oxygen particle ions.

2. A method for irradiating a target in a low oxygen environment using a particle beam including the steps of:

forming a plurality of oxygen particle ions having an energy between 1 and 10 electron volts and a first predetermined electrical potential from a particle supply in a particle beam means;

charging the target with a second predetermined electrical potential;

directing said oxygen particle ions from the particle beam means toward the target, the target including a substrate and a proximal episubstrate layer;

accelerating said oxygen particle ions toward the target;

inducing a chemical interaction among said oxygen particle ions and said episubstrate layer in which constituents of said episubstrate layer combine with derivatives of said oxygen particle ions; and dissociating a substantial portion of said episubstrate layer from said substrate.

3. A method for cleaning contaminant organic films from surfaces of objects in space including the steps of:

charging a surface bearing a contiguous film of organic contaminants with a first predetermined electrical potential;

impinging a cleaning agent of oxygen particles having an energy between 1 and 10 electron volts and a second predetermined electrical potential upon said surface;

liberating said contaminants by volatilizing them in chemical oxidation reactions with said cleaning agent; and substantially eliminating said film without damaging said surface.

4. A method according to claim 3 in which:
said oxygen particles are molecular particles.

5. A method according to claim 3 in which:
said oxygen particles are atomic particles.

6. A method according to claim 3 in which:
said oxygen particles are oxygen molecules.

7. A method according to claim 3 in which:
said cleaning agent which impinges upon said surface bearing a contiguous film of organic contaminants is deployed by releasing said cleaning agent into ambient space from an on-board supply during a period of solar instability in order to ionize a portion of said cleaning agent and attracting and accelerating said released cleaning agent back toward said surface by electrostatic forces resulting from said solar instability.

8. A method for restoring the effectiveness and prolonging the life of satellites and space vehicles by renewing the efficiency of their solar cells including the steps of:

rendezvousing in space with a craft having solar cells that collect sunlight for conversion into electricity;

charging the solar cells with a first predetermined electrical potential;

shooting a cleaning agent of oxygen particles having an energy between 1 and 10 electron volts and a second predetermined electrical potential from a particle beam means at the faces of the solar cells; and removing unwanted, opacifying organic contaminant films covering the solar cells by chemical interaction between said cleaning agent and said films in order to restore their original full capacity to generate power.

* * * * *